US010042212B2

(12) United States Patent
Mori

(10) Patent No.: US 10,042,212 B2
(45) Date of Patent: Aug. 7, 2018

(54) LIQUID CRYSTAL DISPLAY DEVICE AND METHOD OF MANUFACTURING THE SAME

(71) Applicant: Japan Display Inc., Minato-ku (JP)

(72) Inventor: Ayumi Mori, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 11 days.

(21) Appl. No.: 15/283,741

(22) Filed: Oct. 3, 2016

(65) Prior Publication Data

US 2017/0023815 A1 Jan. 26, 2017

Related U.S. Application Data

(63) Continuation of application No. 14/245,386, filed on Apr. 4, 2014, now Pat. No. 9,488,870.

(30) Foreign Application Priority Data

Apr. 9, 2013 (JP) .................................. 2013-081070

(51) Int. Cl.
G02F 1/1339 (2006.01)
G02F 1/1333 (2006.01)
G02F 1/1335 (2006.01)

(52) U.S. Cl.
CPC ........ *G02F 1/1339* (2013.01); *G02F 1/13394* (2013.01); *G02F 1/133345* (2013.01);
(Continued)

(58) Field of Classification Search
CPC ...................... G02F 1/133351; G02F 1/13394
See application file for complete search history.

(56) References Cited

U.S. PATENT DOCUMENTS 7,414,695 B2    8/2008  Kim
7,446,826 B2 *  11/2008 Ro .................... G02F 1/13394
                                                349/153
(Continued)

FOREIGN PATENT DOCUMENTS

JP      2008-83206      4/2008
JP      2011-17831      1/2011
(Continued)

OTHER PUBLICATIONS

Office Action dated Feb. 2, 2016 in Japanese Patent Application No. 2013-081070 filed Apr. 9, 2013 (w/English translation).

*Primary Examiner* — Kendrick Hsu
(74) *Attorney, Agent, or Firm* — Oblon, McClelland, Maier & Neustadt, L.L.P.

(57) ABSTRACT

A first organic insulating film is arranged in a circumference area outside an active area on a first substrate. A circumference color filter is arranged in the circumference area on a second substrate. A second organic insulating film covers the circumference color filter. A seal material is arranged between the first and second organic insulating films to attach the first substrate and the second substrate. The seal material extends up to a position in which end portions of the first and second substrates overlap. A first spacer is arranged between the first and second organic insulating films in the circumference area. The first spacer is arranged on an active area side in the seal material. A second spacer is formed between the first and second organic insulating films in a position in which the end portions of the substrates overlap.

6 Claims, 4 Drawing Sheets

(52) U.S. Cl.
CPC .. *G02F 1/133351* (2013.01); *G02F 1/133514* (2013.01); *G02F 2001/13396* (2013.01); *G02F 2001/133388* (2013.01); *G02F 2202/02* (2013.01)

(56) References Cited

U.S. PATENT DOCUMENTS

| | | | |
|---|---|---|---|
| 7,656,495 | B2 | 2/2010 | Weng |
| 7,728,948 | B2 | 6/2010 | Nishi |
| 8,031,320 | B2 | 10/2011 | Lee |
| 2010/0149477 | A1 | 6/2010 | Nagami |
| 2011/0007251 | A1* | 1/2011 | Yamamoto ........ G02F 1/133514 349/108 |
| 2011/0069271 | A1 | 3/2011 | Chu |
| 2012/0133870 | A1 | 5/2012 | Park |
| 2012/0314148 | A1* | 12/2012 | Yamaguchi ......... H01L 51/5246 349/42 |

FOREIGN PATENT DOCUMENTS

| | | |
|---|---|---|
| JP | 2011-75623 | 4/2011 |
| JP | 2012-3149 | 1/2012 |
| JP | 2012-32506 | 2/2012 |

\* cited by examiner

LIQUID CRYSTAL DISPLAY DEVICE AND METHOD OF MANUFACTURING THE SAME

CROSS-REFERENCE TO RELATED APPLICATION

This application is a continuation of and claims the benefit of priority under 35 U.S.C. § 120 from U.S. Ser. No. 14/245,386 filed Apr. 4, 2014, and claims the benefit of priority under 35 U.S.C. § 119 from Japanese Patent Application No. 2013-81070 filed Apr. 9, 2013, the entire contents of each of which are incorporated herein by reference.

FIELD

Embodiments described herein relate generally to a liquid crystal display device and a method of manufacturing the same.

BACKGROUND

Liquid crystal display devices are widely used as typical display devices for various kinds of equipments. The liquid crystal display panel holding a liquid crystal layer between an array substrate and a counter substrate is manufactured using a large-sized mother substrate. That is, after manufacturing a plurality of liquid crystal display panels collectively, each liquid crystal display panel is obtained by cutting the mother substrate.

In recent years, a frame portion of the liquid crystal display panel, i.e., the width between an active area and a panel end tends to become narrow. More demand for the narrow frame is growing, more variations of location and width of a seal material to attach the array substrate and the counter substrate are resulted depending on accuracy of the seal material formation, and also variation of distance between a cut line of the mother substrate and an outer end of the seal material is easily resulted. For this reason, there is a possibility that variation in cutting accuracy may be caused due to the variation generated in the seal material.

On the other hand, a technology is proposed, in which a resin layer is arranged for banking seal material in the outside of seal formation areas, and respective pixels are cut down simultaneously from the mother substrate along the cut line provided between the adjacent resin layers.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
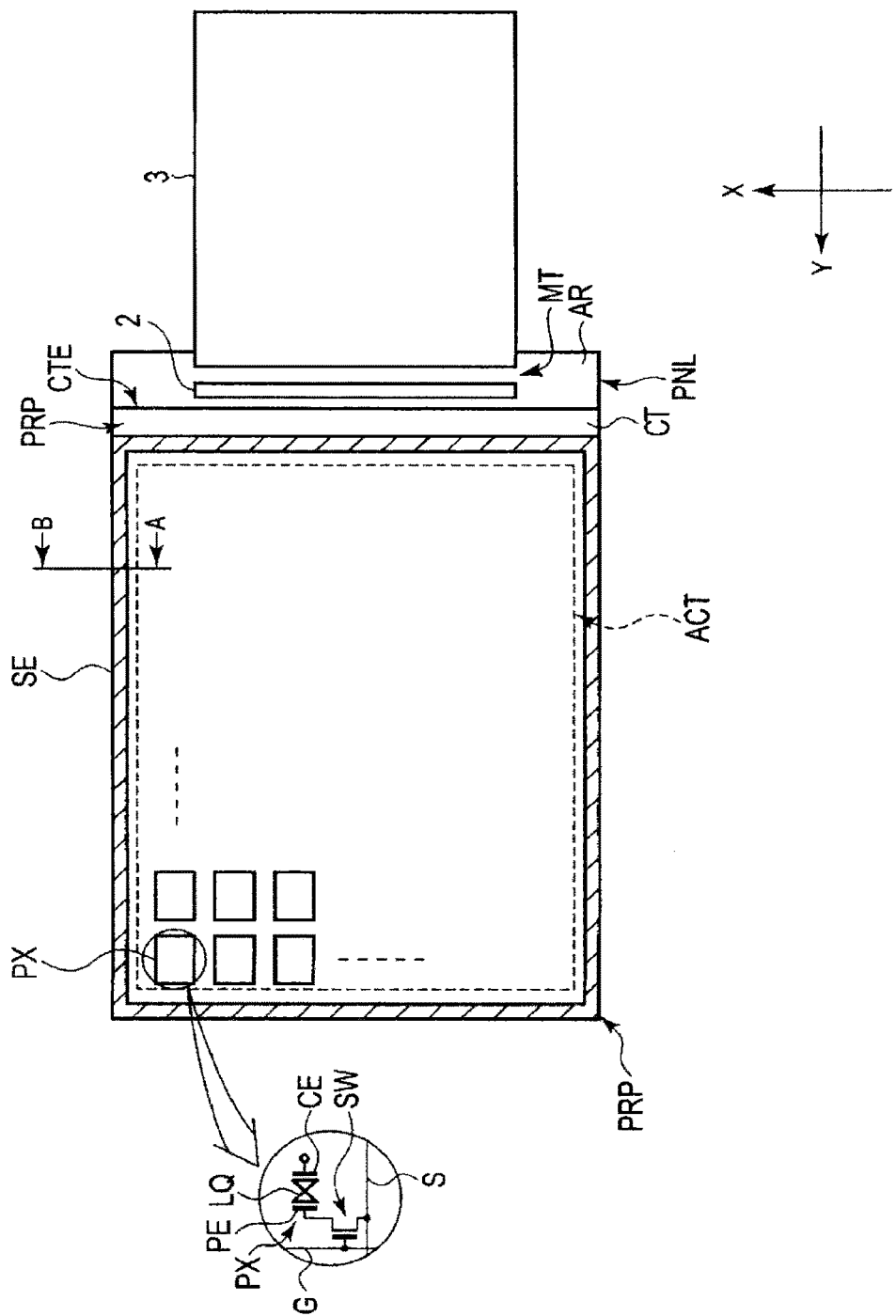
FIG. 1 is a plan view schematically showing a display panel PNL applicable to the liquid crystal display device according to an embodiment.

A liquid crystal display device and a method of manufacturing the same according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a first insulating substrate, and a first organic insulating film arranged in a circumference area outside an active area for displaying images, a second substrate including; a second insulating substrate, a circumference shield layer arranged on the second insulating substrate facing the first substrate in the circumference area, a circumference color filter laminated on the circumference shield layer in the circumference area, and a second organic insulating film covering the circumference color filter, a seal material arranged between the first organic insulating film and the second organic insulating film to attach the first substrate and the second substrate, the seal material linearly extending up to a position in which a first end portion of the first insulating substrate overlaps with a second end portion of the second insulating substrate; a first spacer arranged between the first organic insulating film and the second organic insulating film in the circumference area, the first spacer being arranged on an active area side in the seal material; a second spacer formed in a position in which the first end portion overlaps the second end portion and arranged between the first organic insulating film and the second organic insulating film; and a liquid crystal layer held inside surrounded with the seal material between the first substrate and the second substrate.

According to other embodiment, a method of manufacturing a liquid crystal display device, comprising the steps: preparing a first mother substrate having first and second display cells adjacent to each other, respectively including a first organic insulating film arranged in a circumference area outside an active area for displaying images, preparing a second mother substrate having the first and second display cells, respectively including, a circumference shield layer arranged on the second mother substrate in the circumference area, a circumference color filter formed on the circumference shield layer in the circumference area, and a second organic insulating film covering the circumference color filter, forming a seal material arranged between the first organic insulating film and the second organic insulating film to attach the first mother substrate and the second mother substrate; forming a first spacer arranged between the first organic insulating film and the second organic insulating film in the circumference area in the first and the second display cells, the first spacer being arranged on an active area side in the seal material, forming a second spacer striding over a cutting line between the first and second display cells and between the first organic insulating film and the second organic insulating film; forming a liquid crystal layer held inside surrounded with the seal material between the first mother substrate and the second mother substrate, and cutting down the first and second mother substrates along the cutting line to separate the first display cell and the second display cell, wherein the seal material is arranged between the first organic insulating film and the second spacer or between the second organic insulating film and the second spacer.

FIG. 1 is a plan view schematically showing a display panel PNL applicable to the liquid crystal display device according to an embodiment of the present invention.

The display panel PNL is formed of an active-matrix type liquid crystal display panel, and equipped with a liquid crystal layer LQ held between an array substrate AR and a counter substrate CT facing the array substrate AR. The array substrate AR and the counter substrate CT are pasted together by a seal material SE while a predetermined cell gap is formed between the substrates. In the illustrated example, the seal material SE is formed in the shape of rectangular frame. The cell gap is formed of pillar-shaped spacers arranged in the array substrate AR or the counter substrate CT. The liquid crystal layer LQ is held in the cell gap formed between the array substrate AR and the counter substrate CT, and surrounded with the seal material SE. The display panel PNL is equipped with an active area ACT which displays a picture on the inner side surrounded by the seal material SE. The active area ACT is formed of an approximately rectangular shape, and formed of a plurality of pixels PX arranged in the shape of a matrix, for example.

The array substrate AR is equipped with a gate line G extending in a first direction X, a source line S extending in a second direction Y orthogonally crossing the X direction so as to cross the gate line G, a switching element SW connected with the gate line G and the source line S, a pixel electrode PE connected with the switching element SW, etc. Although the counter substrate CT is equipped with a counter electrode CE facing each of the pixel electrodes PE through the liquid crystal layer LQ, for example, the array substrate AR may be equipped with the counter electrode CE.

In addition, explanation is omitted about the detailed structure of the display panel PNL. In the modes such as TN (Twisted Nematic) mode, OCB (Optically Compensated Bend) mode, and VA (Vertical Aligned) mode which mainly use vertical electric field, while the array substrate AR, is equipped with the pixel electrode PE, the counter substrate CT is equipped with the counter electrode CE. Moreover, the array substrate AR is equipped with the both of the pixel electrode PE and the counter electrode CE in the modes which mainly use lateral electric field, such as IPS (In-Plane Switching) mode and FFS (Fringe Field Switching) mode.

A signal source necessary to drive the display panels PNL, such as a driving IC chip 2 and a flexible printed circuit (FPC) substrate 3, is mounted in a circumference area PRP outside the active area ACT. In this embodiment, the driving IC chip 2 and the FPC substrate 3 are mounted in a mounting portion MT of the array substrate AR which extends to outside a substrate end CTE of the counter substrate CT. The circumference area PRP is an area surrounding the active area ACT, and formed in the shape of a rectangular frame including an area in which the seal material SE is arranged.

The illustrated display panel PNL is formed in the rectangular shape so that a substrate end of the array substrate AR and a substrate end of the counter substrate CT overlap, and three ends form panel ends except for the mounting portion MT. The seal material SE extends to the panel ends in the three ends except for the mounting portion MT.

Figure 2:
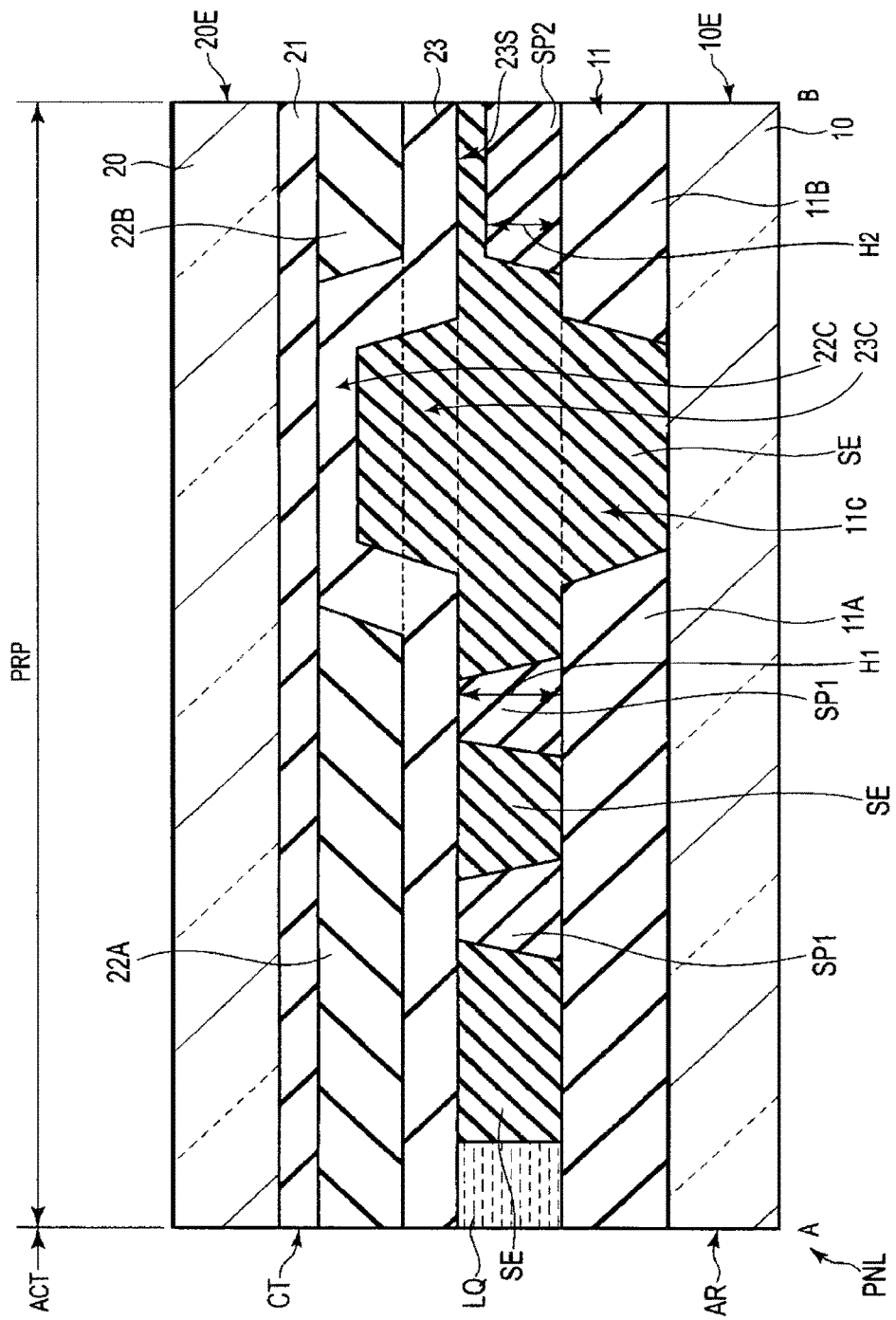
FIG. 2 is a cross-sectional view schematically showing a structure in a circumference area PRP of the display panel PNL taken along line A-B shown in FIG. 1.

FIG. 2 is a cross-sectional view schematically showing a structure in the circumference area PRP of the display panel PNL taken along line A-B shown in FIG. 1.

The array substrate AR is formed using a transparent first insulating substrates 10, such as a glass substrate and a resin substrate. The array substrate AR is equipped with a circumference wiring which is not shown and a first organic insulating film 11, etc., in the circumference area PRP on the first insulating substrate facing the counter substrate CT. In addition, although not illustrated, the array substrate AR is equipped with the switching element, the pixel electrode, an alignment film, etc., in the active area ACT on the first insulating substrate 10 facing the counter substrate CT. Moreover, in the circumference area PRP, other insulating films may be arranged between the first insulating substrate 10 and the first organic insulating film 11.

The first organic insulating film 11 extends not only to the circumference area PRP but the active area ACT. In the circumference area PRP, the first organic insulating film 11 includes a first segment 11A on a side close to the active area ACT and a second segment 11B on a side close to a substrate end 10E of the array substrate AR. The second segment 11B extends up to the substrate end 10E. In the illustrated example, a first concave portion 11C is formed between the first segment 11A and the second segment 11B in the first organic insulating film 11. The surfaces of the first segment 11A and the second segment 11B are substantially flat, respectively. The first concave portion 11C has a depth penetrating to the first insulating substrate 10, for example. The organic insulating film 11 is formed, for example, of a transparent resin material.

On the other hand, the counter substrate CT is formed using a transparent second insulating substrate 20, such as the glass substrate and the resin substrate. The counter substrate CT is equipped with a circumference shield layer 21, a circumference color filter 22, a second organic insulating film 23, etc., in the circumference area PRP on the second insulating substrate 20 so as to face the array substrate AR. In addition, although not illustrated, the counter substrate CT is equipped with a black matrix, a color filter layer, an alignment film, etc., in the active area ACT.

The circumference shield layer 21 is formed on the second insulating substrate 20 facing the array substrate AR, and extends to substantially whole area of the circumference area PRP. That is, the circumference shield layer 21 is located above portions of the first segment 11A, the second segment 11B, and the first concave portion 11C, and formed continuously without breaking off up to a substrate end 20E of the counter substrate CT. The circumference shield layer 21 has a constant film thickness. Moreover, the circumference shield layer 21 is formed with the same material as the black matrix in the active area ACT, and connected with the black matrix. The circumference shield layer 21 is formed of the resin material colored in black or light shielding metal material such as chromium (Cr), etc.

The circumference color filter 22 is formed on the circumference shield layer 21. In the circumference area PRP, the circumference color filter 22 includes a second segment 22B on a side close to the substrate end 20E while including a first segment 22A on a side close to the active area ACT. The second segment 22B extends up to the substrate end 20E. In the illustrated example, a second concave portion 22C is formed between the first segment 22A and the second segment 22B in the circumference color filter 22. The second concave portion 22C has a depth penetrating to the circumference shield layer 21, for example. The second concave portion 22C is formed in a position which counters with the first concave portion 11C. The second concave portion 22C is formed so that the second concave portion 22C gradually spreads from a portion penetrating up to the circumference shield layer 21 toward the array substrate AR.

The color filter arranged in the active area ACT is formed of a red color filter arranged corresponding to a red pixel, a green color filter arranged corresponding to a green pixel and a blue color filter arranged corresponding to a blue pixel. The color filters are formed of the resin material colored in red, green, blue, etc., respectively. The above-mentioned circumference color filter 22 is formed with the same material as one of the color filter layers arranged in the active area ACT. In this embodiment, the circumference color filter 22 is formed with the same material as the blue color filter, for example.

The second organic insulating film 23 extends to not only the circumference area PRP but the active area ACT. In the circumference area PRP, the second organic insulating film 23 covers the second concave portion 22C while covering the circumference color filter 22. That is, the second organic insulating film 23 covers the circumference shield layer 21 exposed by the second concave portion 22C while being laminated on the first segment 22A and the second segment 22B. In the illustrated example, a third concave portion 23C is formed in a position which covers the second concave portion 22C in the second organic insulating film 23. The surface of the second organic insulating film 23 laminated on the first segment 22A and the second segment 22B is substantially flat. The third concave portion 23C is formed so that the third concave portion 23C gradually spreads from its bottom portion toward the array substrate AR. The second organic insulating film 23 is formed of a transparent resin material, for example.

The display panel PNL is further equipped with a first spacer SP1 and a second spacer SP2 in the circumference area PRP. Each of the first and second spacers SP1 and SP2 is arranged between the first organic insulating film 11 and the second organic insulating film 23. The first spacer SP1 is located on a side close to the active area ACT, and the second spacer SP2 is located on the substrate ends 10E, 20E side. In the illustrated example, the first spacer SP1 and second spacer SP2 are formed in the columnar shape in the array substrate AR. Precisely, the first spacer SP1 and second spacer SP2 are formed on the first organic insulating film 11 in the shape of taping off toward the counter substrate CT.

The height H1 of the first spacer SP1 is higher than the height I-I2 of the second space SP2. Therefore, while the tip portion of the first spacer SP1 contacts the second organic insulating film 23, the tip portion of the second spacer SP2 is apart from the second organic insulating film 23. That is, a clearance is formed between the second spacer SP2 and the second organic insulating film 23.

In addition, the counter substrate CT may be equipped with each of the first spacer SP1 and the second spacer SP2. In this case, they are formed on the second organic insulating film 23, and formed in the shape of tapering off toward the array substrate AR.

The seal material SE which attaches the array substrate AR and the counter substrate CT are formed between the first organic insulating film 11 the second organic insulating film 23. Moreover, the seal material SE is filled in the first concave portion 11C and the third concave portion 23C. Furthermore, the seal material SE is filled between the second spacer SP2 and the second organic insulating film 23, and extends up to the position in which the substrate end 10E and the substrate end 20E overlap each other. That is, the seal material SE is exposed in the location in which the substrate end 10E and the substrate end 20E overlap. The first spacer SP1 is surrounded with the seal material SE.

The liquid crystal layer LQ is enclosed inside the seal material SE (active area side).

Figure 3:
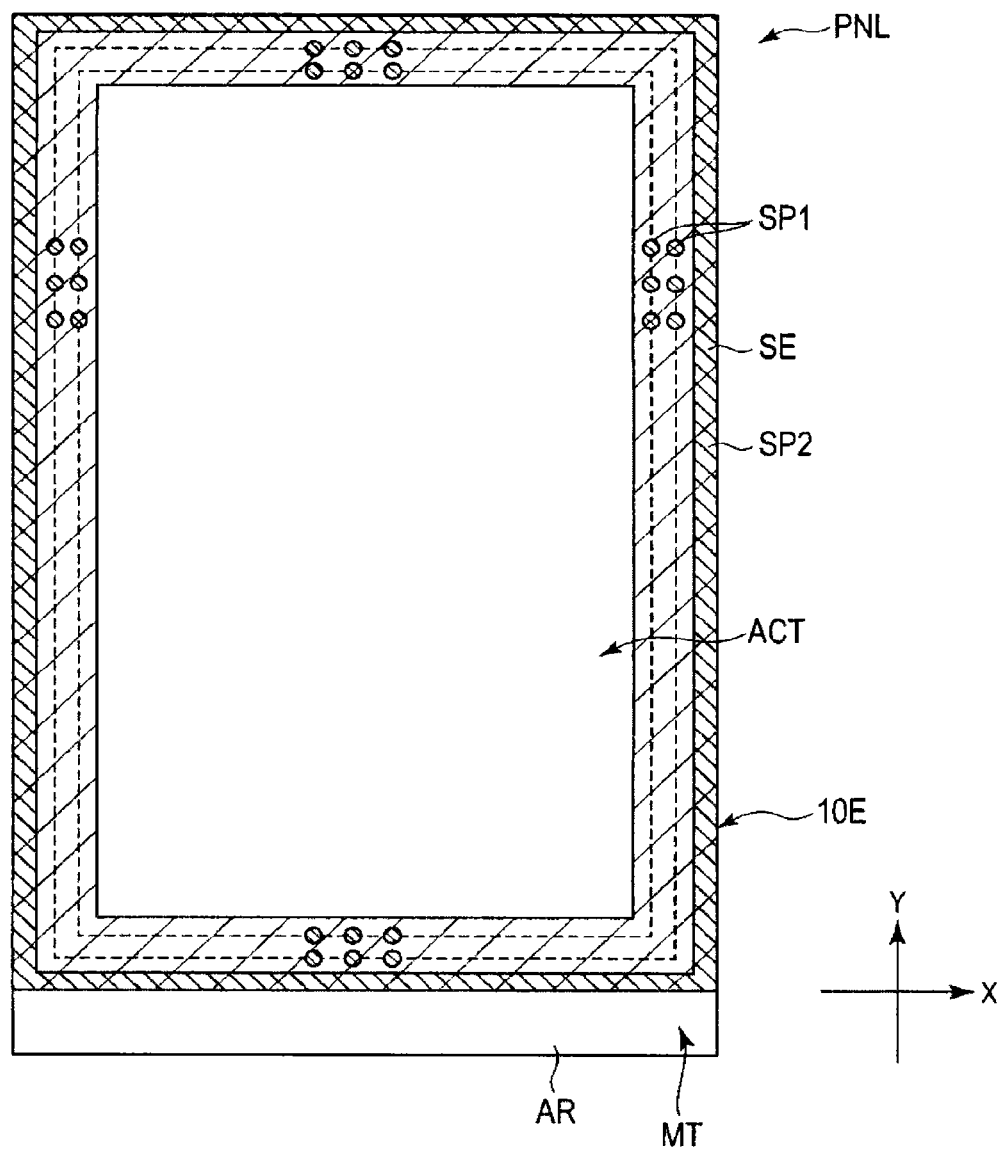
FIG. 3 is a view showing a layout of a seal material SE, a first spacer SP1 and a second spacer SP2 in the display panel PNL according to the embodiment.

FIG. 3 is a view showing a layout of the seal material SE, the first spacer SP1 and the second spacer SP2 in the display panel PNL according to the embodiment. Here, only the principal portion required for explanation is illustrated.

The seal material SE extends up to the substrate end 10E in the three sides of the array substrate AR except for the mounting portion MT. The first spacer SP1 is located in the seal material SE, and formed in the shape of a dot. Although the illustrated example shows the case where the first spacers SP1 are formed in two lines, the layout and arrangement density of the first spacer SP1 are not restricted to this example. For example, it is possible to control the cell gap of the circumference area PRP by adjusting the arrangement density of the first spacer SP1. More specifically, since the seal material SE invades between the first spacer SP1 and the counter substrate CT by arranging the first spacer SP1 densely, the attached substrate CT easily warps upward. At this time, the density per unit area of the first spacer SP1 located in the seal material SE is made larger than the density per unit area of the spacer arranged in the exterior of the seal material SE, i.e., the active area ACT. According to such composition, the cell gap of the circumference area PRP becomes larger than the cell gap of the active area ACT. The expansion of the cell gap which arose in the circumference area PRP is utilizable as space which accommodates the excessive liquid crystal material injected more than needed by One Drop Fill (ODF) method in the manufacturing process. That is, since a surplus liquid crystal material is accommodated by the space which is formed by warping up of the counter substrate CT in the circumference area PRP, the thickness of the liquid crystal layer becomes uniform in the active area ACT. Therefore, it becomes possible to achieve excellent and uniform display grace throughout the active area ACT. In three sides except for the mounting portion MT, the second spacer SP2 is formed in the shape of a straight line along the substrate end 10E. The illustrated example shows the case where the second spacer SP2 is formed in the shape of a rectangular frame in which the second spacer SP2 extends continuously. In addition, the form of the second spacer SP2 may break off in the middle without being restricted to this example.

Next, an example of a manufacturing method of the above-mentioned display panel PNL is explained briefly.

First, a mother substrate which collectively forms a plurality of array substrates AR is prepared. The first mother substrate is formed using an insulating substrate which becomes the first insulating substrate, and equipped with various wirings, such as the gate line, the source line, the switching element, etc., and various insulating films such as the organic insulating film, the pixel electrode, the alignment film, the first spacer, the second spacer, etc.

On the other hand, a second mother substrate which collectively forms a plurality of counter substrates CT is prepared. The second mother substrate is formed using an insulating substrate which becomes the second insulating substrate, and equipped with the black matrix, the circumference shield layer, the circumference color filter, the color filter layer, the second organic insulating film, the second alignment film, etc.

Then, after arranging the seal material on the first mother substrate or the second mother substrate so that the seal material surrounds the active area, the liquid crystal material is dropped on the inner side surrounded with the seal material. Successively, the first mother substrate and the second mother substrate are attached together.

Then, the display panels PNL are taken out from a pair of mother substrates, in which the liquid crystal layer is held between the first mother substrate and the second mother substrate. In this process, the both of the first mother substrate and the second mother substrate are cut along cutting lines, respectively. Thereby, the display panel PNL holding the liquid crystal layer LQ between the array substrate AR and the counter substrate CT is manufactured.

Figure 4:
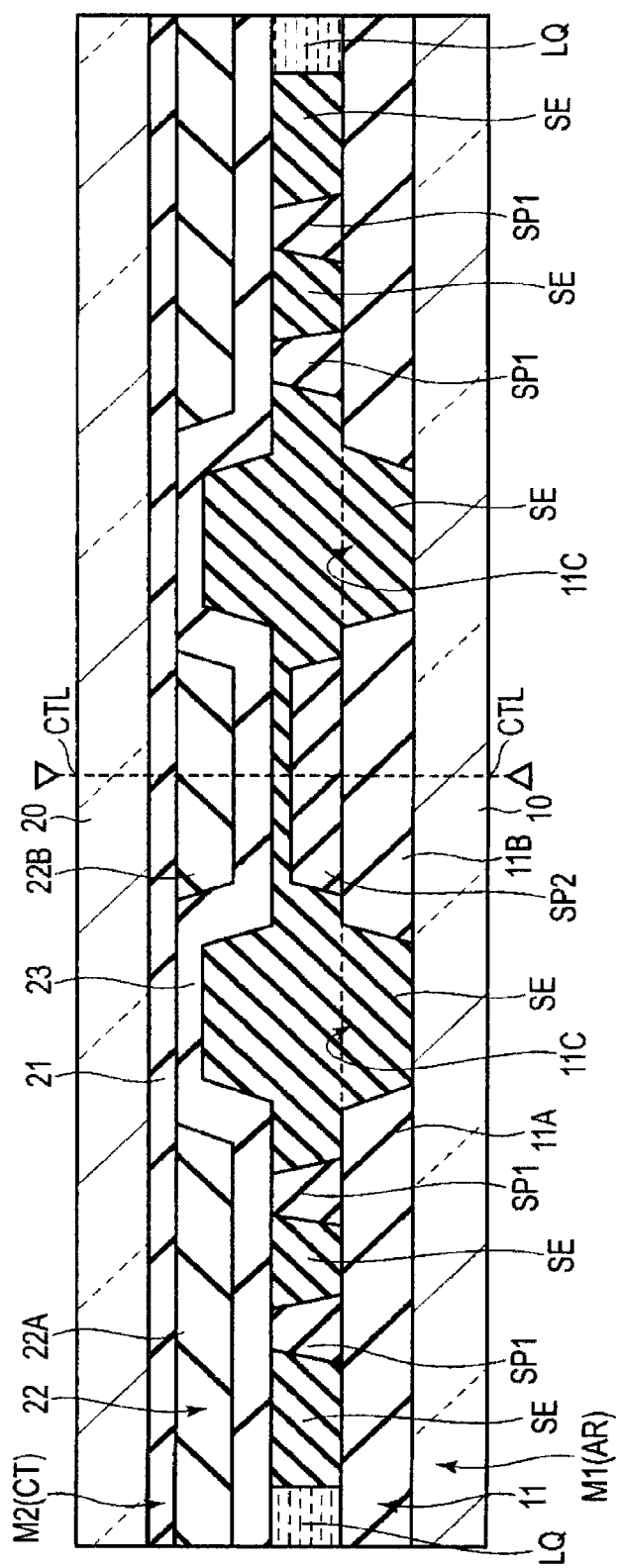
FIG. 4 is a cross-sectional view schematically showing a cutting process for cutting a pair of mother substrates according to the embodiment.

FIG. 4 is a cross-sectional figure showing the cutting process for cutting down the pair of mother substrates.

As illustrated, in the first mother substrate M1, the second segment 11B of the first organic insulating film 11 and second spacer SP2 are formed so as to stride over a cutting line CTL. In this process for preparing the first mother substrate, the first concave portion 11C in the shape of a slit is formed on the both sides of the second segment 11B. Then, when forming the first spacer SP1 and the second spacer SP2, a portion of the insulating material formed on the first organic insulating film 11 flows into the first concave portion 11C. Accordingly the thickness of the insulating material in a location sandwiched by the pair of the first concave portions 11C becomes thin. As a consequence, the height of the second spacer SP2 formed on the second segment 11B becomes lower than the height of the first spacer SP1 formed on the first segment 11A.

On the other hand, in the second mother substrate M2, the circumference shield layer 21, the second segment 22B of the circumference color filter 22 and the second organic insulating film 23 are formed so as to stride over the cutting line CTL.

In the cells arranged on the both sides sandwiching the cutting line CTL, the first mother substrate M1 and the second mother substrate M2 in each cell are attached after the seal material SE is applied. Accordingly, the seal material SE spreads and also extends between the second spacer SP2 and the second organic insulating films 23, and the seal material SE applied to the respective regions are connected each other.

The blade of the cutting element used in the cutting process is pressed to respective cutting lines CTL of the first mother substrate M1 and the second mother substrate M2. The pressure from the cutting element is transferred to the first mother substrate M1 and the second mother substrate M2. Accordingly, the crack is developed, and the mother substrates are cut along the cutting line CTL. Thereby, the display panels PNL holding the liquid crystal layer LQ between the array substrate AR and the counter substrate CT are manufactured.

According to the embodiment, the seal material SE extends up to a location in which the substrate end 10E of the array substrate AR overlap the substrate end 20E of the counter substrate CT. That is, when cutting down the array substrates AR from the first mother glass M1 and the counter substrates CT from the second mother substrate M2, the seal material SE is arranged along the cutting line.

In recent years, the demand for the narrow frame with a short distance between the active area ACT and the substrate ends 10E and 20E is increasing. For this reason, we are anxious about the variation in the cutting accuracy resulted from formation accuracy of the seal material SE. However, since the spreading resistance of the seal material SE is reduced, the seal material SE easily spreads up to the substrate ends 10E and 20E. Thereby, it becomes possible to reduce the variation in the formation accuracy of the seal material SE, and to reduce the variation in the cutting accuracy resulted from the formation accuracy of the seal material SE. Accordingly, it becomes possible to control the fall of the manufacturing yield.

Moreover, since the seal material SE is filled up not only between the first organic insulating film 11 and the second organic insulating film 23 but also in the first concave portion 11C and the third concave portion 23C, it becomes possible to increase the amount of the applied seal material SE. Further, it becomes possible to increase the areas of the array substrate and the counter substrate, in which the seal material SE contacts, respectively. For this reason, it becomes possible to improve adhesive strength to attach the array substrate AR and the counter substrate CT by the seal material SE.

Moreover, it becomes possible to adjust invaded seal amount SE between the substrate and the first spacer SP1 by adjusting the arrangement density of the first spacer SP1 located in the seal material SE, and thereby the cell gap in the circumference area PRP. For example, the attached counter substrate CT warps upward by adjusting the arrangement density of the first spacer SP1. Accordingly, it becomes possible to make the cell gap of the circumference area PRP larger than that of the active area ACT. Since surplus liquid crystal material is accommodated by the space which is formed by the warping up of the counter substrate CT in the circumference area PRP, the thickness of the liquid crystal layer in the active area ACT becomes uniform. Therefore, it becomes possible to achieve excellent and uniform display grace throughout the active area ACT.

As explained above, according to the embodiment, the liquid crystal display device which can control decrease of manufacturing yield can be supplied.

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

What is claimed is:
1. A liquid crystal display device, comprising:
  a first substrate including;
    a first insulating substrate, and
    a first organic insulating film including a first concave portion and arranged on the first insulating substrate in a circumference area outside an active area for displaying images,
  a second substrate including;
    a second insulating substrate, and
    a color filter including a second concave portion and arranged on the second insulating substrate facing the first substrate in the circumference area,
  a seal material arranged between the first organic insulating film and the color filter to attach the first substrate and the second substrate;
  a first spacer arranged between the first organic insulating film and the color filter, the first spacer being arranged on an active area side in the seal material;
  a second spacer arranged between the first organic insulating film and the color filter, the second spacer being arranged closer to a first substrate end of the first insulating substrate than the first spacer in the seal material; and
  a liquid crystal layer held in a gap surrounded with the seal material between the first substrate and the second substrate,
  wherein the first concave portion and the second concave portion are arranged between the first spacer and the second spacer.

2. The liquid crystal display device according to claim 1, wherein the seal material is arranged in the first concave portion and the second concave portion.

3. The liquid crystal display device according to claim 1, wherein the first spacer is taller than the second spacer.

4. The liquid crystal display device according to claim 3, wherein the first spacer contacts both of the first substrate and the second substrate, and the second spacer contacts one of the first substrate and the second substrate.

5. The liquid crystal display device according to claim 4, wherein
the second spacer includes a first side surface facing the first spacer, a second side surface located closer to the first substrate end than the first side surface, and a top surface,
the first side surface and the top surface contact the seal material, and the second side surface does not contact the seal material.

6. The liquid crystal display device according to claim 5, wherein the seal material includes a seal end located directly above the top surface.

* * * * *